C. K. TRIPP.
FRICTION CLUTCH.
APPLICATION FILED APR. 7, 1908.
919,401.
Patented Apr. 27, 1909.
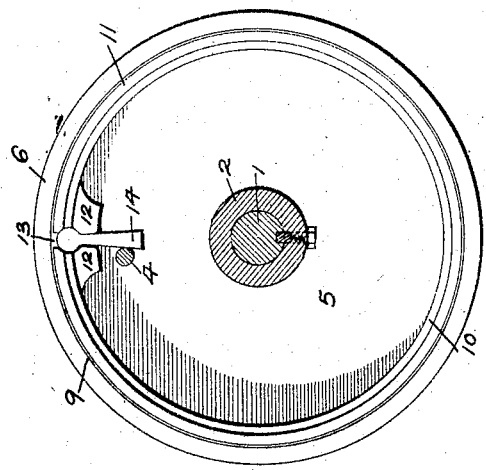
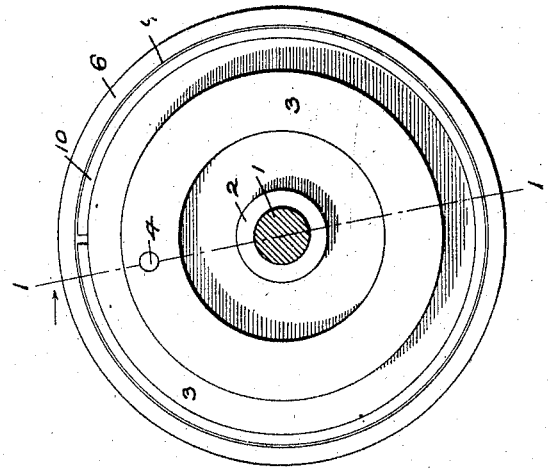
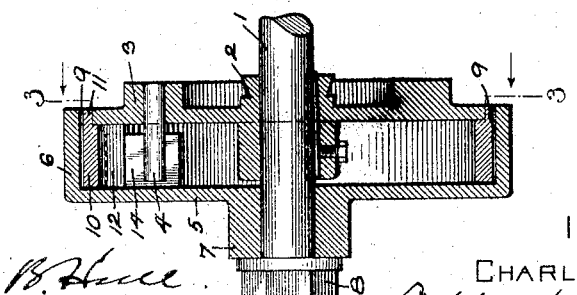
WITNESSES
INVENTOR
CHARLES K. TRIPP
by
ATTY.

UNITED STATES PATENT OFFICE.

CHARLES K. TRIPP, OF LYNN, MASSACHUSETTS, ASSIGNOR TO GENERAL ELECTRIC COMPANY, A CORPORATION OF NEW YORK.

FRICTION-CLUTCH.

No. 919,401.      Specification of Letters Patent.      Patented April 27, 1909.

Application filed April 7, 1908. Serial No. 425,643.

*To all whom it may concern:*

Be it known that I, CHARLES K. TRIPP, a citizen of the United States, residing at Lynn, county of Essex, State of Massachusetts, have invented certain new and useful Improvements in Friction-Clutches, of which the following is a specification.

My invention relates to friction clutches and has for its object a novel arrangement and construction of parts.

My friction clutch is particularly applicable for coupling an electric motor having a small starting torque, such as a single phase induction motor, to a machine which is to be driven.

Heretofore centrifugal clutches have been built with a flexible split ring fastened at one point to the driving member and provided with centrifugally operated means for clutching it to the driven member. Since in such a case the clutching effect varies with the speed of the motor there will be a tendency on the part of the driven member to slip when the motor becomes heavily loaded. By my invention I provide the driving member with a flexible split ring which is normally of slightly less outside diameter than the inside diameter of the driven member and is arranged to be thrown outwardly by centrifugal force to engage the driven member and is then locked to the driven member so as to form a positive driving connection.

Other features of novelty which characterize my invention are pointed out with particularity in the claims annexed and forming a part of this specification. For a better understanding of my invention, however, and the advantages possessed by it reference may be had to the following description taken in connection with the accompanying drawing, in which—

Figure 1 shows a section of my clutch on the line 1 1 of Fig. 2 looking in the direction of the arrow; Fig. 2 is an end view of Fig. 1, and Fig. 3 is a sectional view on the line 3 3 of Fig. 1 looking in the direction of the arrows.

The shaft 1 is driven by any suitable means, such as an electric motor, and has secured thereto a hub 2 carrying a disk 3. A pin 4 is fastened in the disk near its outer periphery. A pulley 5, having a shell or flange 6, and a hub 7 loosely mounted upon the shaft, is kept from moving axially along the shaft to any great extent by suitable means, such as by a nut 8 which is screwed upon the end of the shaft 1. The shell 6 has a rim 9 which incloses the clutch mechanism. The flexible or spring split-ring 10 has a normal outside diameter slightly less than the inside diameter of the flange 6, as shown in the drawing, and also has a projecting flange 11 which engages the periphery of the disk 3, when the driving motor is at rest or rotating at a slow speed. The ring 10 has two projecting portions 12 which are located on both sides of the split 13, and support the lever 14.

My invention is particularly applicable to motors in which the driving and driven members should not be coupled together until the driver has attained a certain speed, which, in the case of a single phase induction motor is nearly its normal speed. By the use of my coupling, the shaft 1 rotates, and with it the disk 3 and the flexible ring 10 but since the outside diameter of the ring is slightly less than the inside diameter of the rim 9, the pulley 5 remains stationary until the motor has obtained nearly its full speed, when the ring is thrown outwardly by centrifugal force. It will not, however, grip the rim 9 of the pulley with sufficient force to rotate the pulley at the same speed as the ring, nor will the ring rotate at the same speed as the disk 3 but lags slightly behind. This lagging behind continues until the pin 4 engages the lever 14. The lever expands the split ring 10 so as to positively lock it to the rim of the pulley, and thereafter the pin and lever act as a positive driving mechanism, the pulley 5 rotating at the same speed as the shaft 1. When the power is thrown off the motor, the shaft 1 ceases to drive and slows down, the pin releases its pressure on the lever and the ring, and since the centrifugal force is not sufficient to hold the flexible ring away from the disk, the pulley is unclutched.

I desire it to be understood that my invention is not limited to the particular construction shown and described, and I aim in the appended claims to cover all modifications which do not depart from the spirit of my invention.

What I claim as new and desire to secure by Letters Patent of the United States, is:

1. In a centrifugal clutch, a driving member, a member to be driven thereby, and a clutch member comprising a flexible split ring normally of slightly less outside diameter than the inside diameter of said driven member and arranged to be thrown outwardly by centrifugal force to engage said driven member, and means for positively locking said ring to said driven member.

2. In a centrifugal clutch, a driving member, a member to be driven thereby, and a clutch member comprising a flexible split ring normally of slightly less outside diameter than the inside diameter of said driven member and arranged to be thrown outwardly by centrifugal force to engage said driven member, and means operated by said driving member for positively locking said ring to said driven member.

3. In a centrifugal clutch, a driving member, a flanged member to be driven thereby, and a clutch member comprising a flexible split ring which is normally of slightly less outside diameter than the inside diameter of said flange, normally embraces said driving member and is arranged to be thrown outwardly by centrifugal force to engage said flange, a lever mechanism for expanding said ring to lock said ring to said flange, and means carried by the driving member for actuating said lever mechanism.

4. In a centrifugal clutch, a driving member, a pin on said driving member, a flanged member to be driven thereby, and a clutch member comprising a split ring normally of slightly less outside diameter than the inside diameter of said flange and arranged to be thrown outwardly by centrifugal force to engage said flange, and a lever arranged to be engaged by said pin and expand said split ring when said ring has been thrown outwardly and engages said flange.

5. In a centrifugal clutch, a driving member, a pin on said driving member, a flanged member to be driven thereby, and a clutch member comprising a flexible split ring normally of slightly less outside diameter than the inside diameter of said flange and arranged to be thrown outwardly by centrifugal force to engage said flange, a lever held by said ring and adapted to be engaged by said pin, and thereby expand said split ring when said ring has been thrown outwardly and engages said flange.

6. In combination, a shaft, a member fastened thereto, a flanged member loosely mounted thereon, a flexible split ring normally of slightly less outside diameter than the inside diameter of said flange and arranged to be thrown outwardly by centrifugal force to engage said flange, and means for positively driving said ring by said member fastened to said shaft when said shaft rotates at a sufficient speed to throw said ring outwardly to engage said flange.

7. In combination, a shaft, a flanged member loosely mounted thereon, a disk fastened thereto, a flexible split ring which is normally of slightly less outside diameter than the inside diameter of said flange, embraces said disk when said shaft is at rest and is arranged to be thrown outwardly by centrifugal force to engage said flange, and means for positively driving said ring by said disk when said shaft rotates at a sufficient speed to throw said ring outwardly to engage said flange.

8. In combination, a shaft, a disk fastened thereto, a pin on said driving member, a flanged member loosely mounted on said shaft, a split ring which is normally of slightly less outside diameter than the inside diameter of said flange, embraces said disk when said shaft is at rest and is arranged to be thrown outwardly by centrifugal force to engage said flange, and a lever adapted to be engaged by said pin and thereby expand said split ring when said ring has been thrown outwardly and engages said flange.

In witness whereof, I have hereunto set my hand this third day of April, 1908.

CHARLES K. TRIPP.

Witnesses:
JOHN A. McMANUS, Jr.,
FRANK G. HATTIE.